US011005292B2

(12) United States Patent
Wang et al.

(10) Patent No.: US 11,005,292 B2
(45) Date of Patent: May 11, 2021

(54) WIRELESS POWER SUPPLY DEVICE AND ELECTRICAL APPARATUS

(71) Applicant: Tyco Electronics (Shanghai) Co. Ltd., Shanghai (CN)

(72) Inventors: Shaoyong Wang, Shanghai (CN); Minjie Chen, Shanghai (CN); Feng Dai, Shanghai (CN); Yuming Song, Shanghai (CN)

(73) Assignee: Tyco Electronics (Shanghai) Co. Ltd., Shanghai (CN)

( * ) Notice: Subject to any disclaimer, the term of this patent is extended or adjusted under 35 U.S.C. 154(b) by 107 days.

(21) Appl. No.: 16/283,215

(22) Filed: Feb. 22, 2019

(65) Prior Publication Data
US 2019/0190317 A1    Jun. 20, 2019

Related U.S. Application Data

(63) Continuation of application No. PCT/IB2017/055039, filed on Aug. 21, 2017.

(30) Foreign Application Priority Data

Aug. 24, 2016 (CN) .......................... 201610715191.9
Aug. 24, 2016 (CN) .......................... 201610717603.2

(51) Int. Cl.
*H01F 38/00* (2006.01)
*H02J 50/10* (2016.01)
(Continued)

(52) U.S. Cl.
CPC .............. *H02J 50/10* (2016.02); *H01F 27/24* (2013.01); *H01F 27/288* (2013.01); *H01F 38/14* (2013.01); *H02J 7/025* (2013.01); *H02J 50/40* (2016.02)

(58) Field of Classification Search
CPC ....................................................... H02J 50/10
(Continued)

(56) References Cited

U.S. PATENT DOCUMENTS 9,701,425 B2 * 7/2017 Lee ......................... B64F 1/362
2012/0248888 A1 * 10/2012 Kesler ................... H02J 7/0029
307/104

(Continued)

FOREIGN PATENT DOCUMENTS

| JP | 4317527 A | 11/1992 |
| WO | 2016048170 A1 | 3/2016 |
| WO | 2016097883 A1 | 6/2016 |

OTHER PUBLICATIONS

PCT Notification, International Search Report and the Written Opinion of the International Searching Authority, International Application No. PCT/IB2017/055039, dated Dec. 12, 2017, 15 pages.

(Continued)

*Primary Examiner* — Rexford N Barnie
*Assistant Examiner* — Dru Parries
(74) *Attorney, Agent, or Firm* — Barley Snyder

(57) ABSTRACT

A wireless power supply device comprises a transmitting coil assembly and a receiving coil assembly. The transmitting coil assembly includes a first ferrite core having a receiving chamber with an opening and a transmitting coil disposed in the receiving chamber of the first ferrite core. The receiving coil assembly is adapted to be moved into the receiving chamber through the opening of the receiving chamber and located at a predetermined position in the receiving chamber. The receiving coil assembly is electromagnetically coupled with the transmitting coil assembly.

24 Claims, 12 Drawing Sheets

(51) Int. Cl.
*H01F 38/14* (2006.01)
*H02J 50/40* (2016.01)
*H01F 27/24* (2006.01)
*H01F 27/28* (2006.01)
*H02J 7/02* (2016.01)

(58) Field of Classification Search
USPC .......................................................... 307/104
See application file for complete search history.

(56) References Cited

U.S. PATENT DOCUMENTS

| | | | |
|---|---|---|---|
| 2015/0115880 A1* | 4/2015 | Soar ........................ | H02J 50/12 |
| | | | 320/108 |
| 2017/0240061 A1* | 8/2017 | Waters .................... | H02J 50/80 |
| 2017/0301462 A1* | 10/2017 | Dela Cruz .............. | H01F 27/02 |

OTHER PUBLICATIONS

Abstract of JP4317527, dated Nov. 9, 1992, 1 page.

\* cited by examiner

WIRELESS POWER SUPPLY DEVICE AND ELECTRICAL APPARATUS

CROSS-REFERENCE TO RELATED APPLICATION

This application is a continuation of PCT International Application No. IB2017/055039 filed on Aug. 21, 2017, which claims priority under 35 U.S.C. § 119 to Chinese Patent Application No. CN201610715191.9 filed on Aug. 24, 2016 and Chinese Patent Application No. CN201610717603.2 filed on Aug. 24, 2016 in the State Intellectual Property Office of China.

FIELD OF THE INVENTION

The present invention relates to a wireless power supply device and, more particularly, to a wireless power supply device having a transmitting coil and a receiving coil.

BACKGROUND

In the prior art, an electric energy for controlling and driving parts of an electrical apparatus is mainly transmitted by electrical wires connected to an external power source or a built-in battery. Internal power of the electrical apparatus is transmitted by the physical connections of electrical wires. The electrical wires may be physically worn and damaged by some of the movable parts of the electrical apparatus, leading to safety problems and reducing the life of the electrical apparatus. The electrical apparatus must therefore undergo frequent maintenance.

A wireless power supply device has recently been used in an electrical apparatus to overcome the problems associated with physical connections of electrical wires. The wireless power supply device coupling coils achieve contactless electric energy transmission among parts of the electrical apparatus. The movable parts of the electrical apparatus are not limited to the location of the electrical wires and may be positioned at any suitable location due to the wireless power supply device, avoiding the problems caused by the physical connections of electrical wires. Moreover, the structural design of the electrical apparatus is more flexible, and the aesthetic feeling and functions of the electrical apparatus may be improved, especially as it relates to household electrical appliances.

The wireless power supply device generally comprises a transmitting coil and a receiving coil electromagnetically coupled with the transmitting coil. The transmitting coil is disposed in a metal case to ensure the electrical apparatus has an aesthetically pleasing appearance. If the metal case is close to the transmitting coil, an alternating magnetic field, generated by the transmitting coil, may induce an eddy current in the surface of the metal case. As is well known to those in the art, the eddy current effect means the power of the electrical system is wasted in the heating of the metal case, which reduces the efficiency and stability of the electrical system. The inductance of the transmitting coil and the receiving coil, as well as the mutual inductance between the transmitting coil and the receiving coil, are affected, and the original matching between the transmitting coil and the receiving coil may become invalid, causing the electrical system to function abnormally.

In order to reduce the eddy current effect, it is normally required to keep a distance between the metal case and the receiving coil of at least 6 mm, requiring an increased size of the metal case and the electrical apparatus and increasing the difficulty of designing an aesthetically pleasing electrical apparatus.

SUMMARY

A wireless power supply device comprises a transmitting coil assembly and a receiving coil assembly. The transmitting coil assembly includes a first ferrite core having a receiving chamber with an opening and a transmitting coil disposed in the receiving chamber of the first ferrite core. The receiving coil assembly is adapted to be moved into the receiving chamber through the opening of the receiving chamber and located at a predetermined position in the receiving chamber. The receiving coil assembly is electromagnetically coupled with the transmitting coil assembly.

BRIEF DESCRIPTION OF THE DRAWINGS

The invention will now be described by way of example with reference to the accompanying Figures, of which.

DETAILED DESCRIPTION OF THE EMBODIMENT(S)

Figure 1:
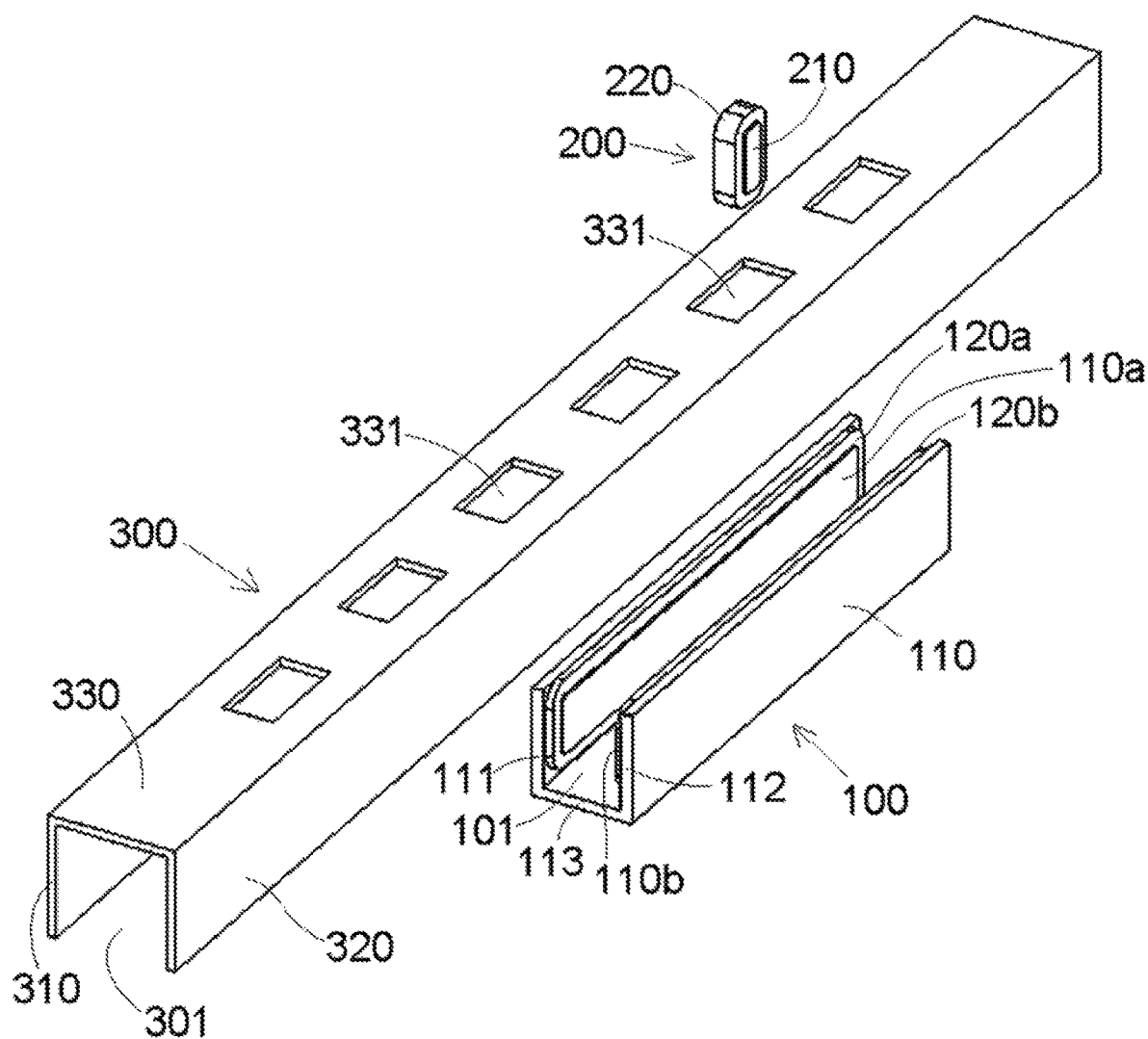
FIG. 1 is an exploded perspective view of a wireless power supply device according to an embodiment.

Embodiments of the present disclosure will be described hereinafter in detail with reference to the attached drawings, wherein like reference numerals refer to like elements. The present invention may, however, be embodied in many different forms and should not be construed as being limited to the embodiment set forth herein; rather, these embodiments are provided so that the present disclosure will convey the concept of the invention to those skilled in the art.

A wireless power supply device according to an embodiment, as shown in FIG. 1, comprises a transmitting coil assembly 100 and a receiving coil assembly 200. The receiving coil assembly 200 is adapted to be electromagnetically coupled with the transmitting coil assembly 100.

Figure 2:
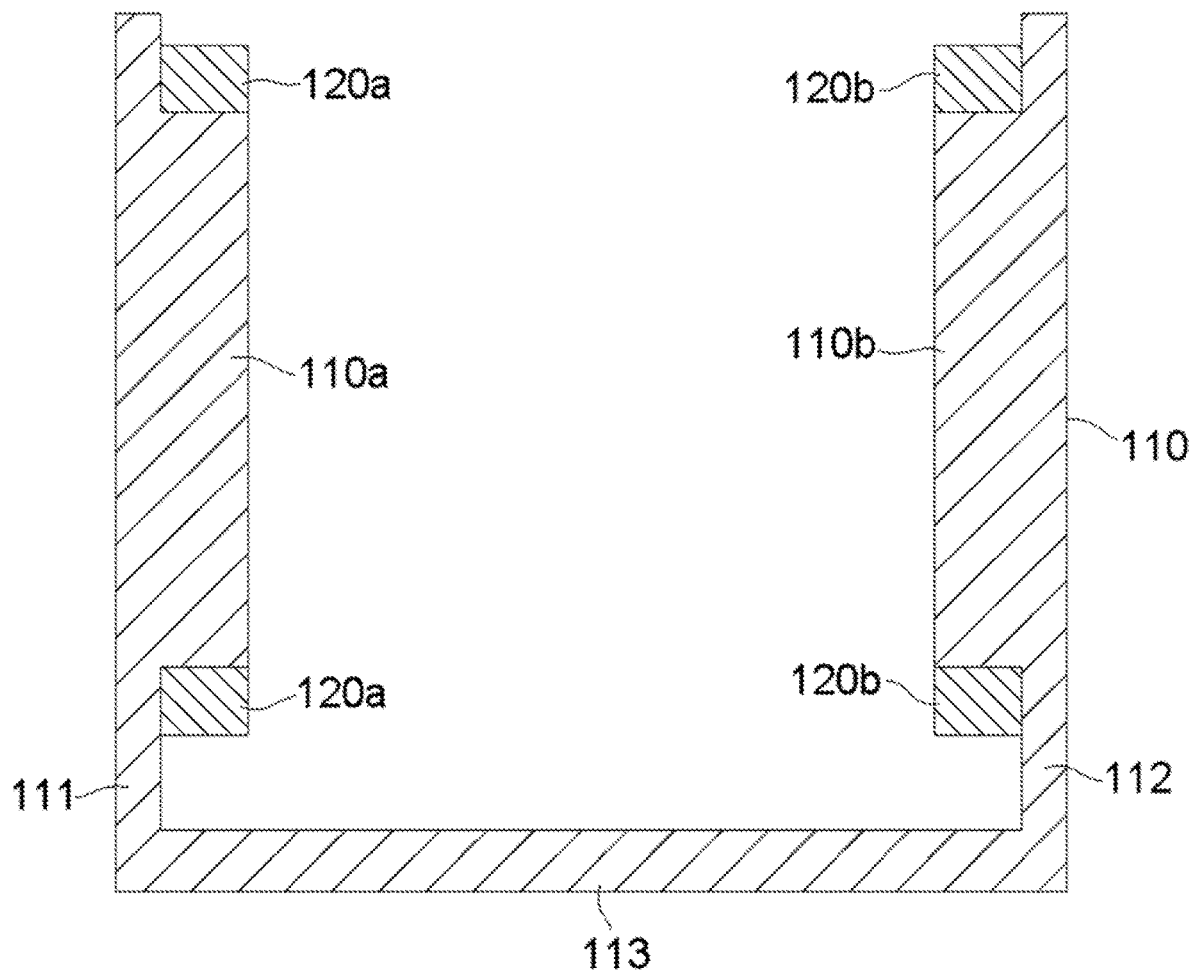
FIG. 2 is a sectional end view of a transmitting coil assembly of the wireless power supply device of FIG. 1.
Figure 3:
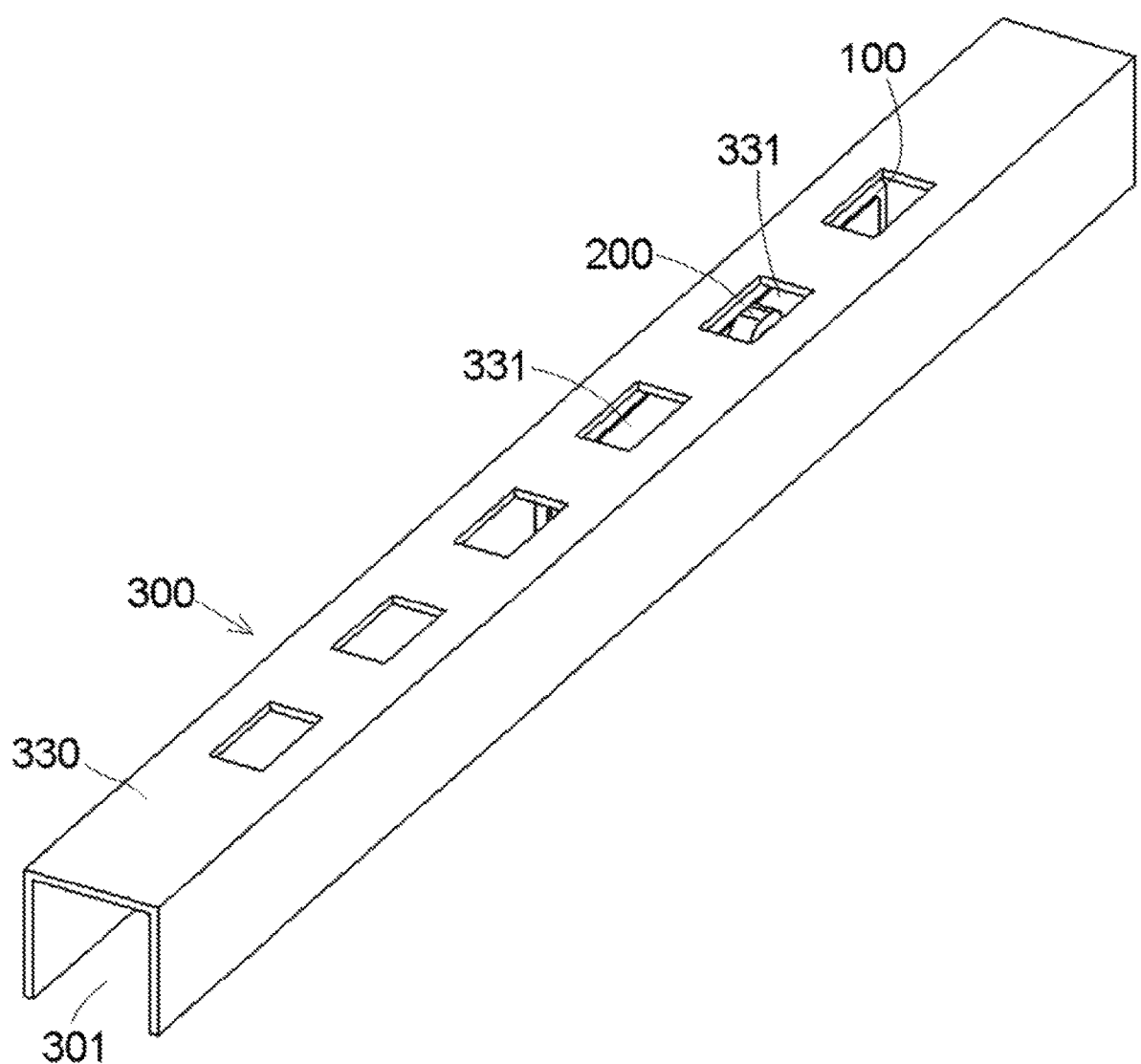
FIG. 3 is a perspective view of the wireless power supply device of FIG. 1.
Figure 4:
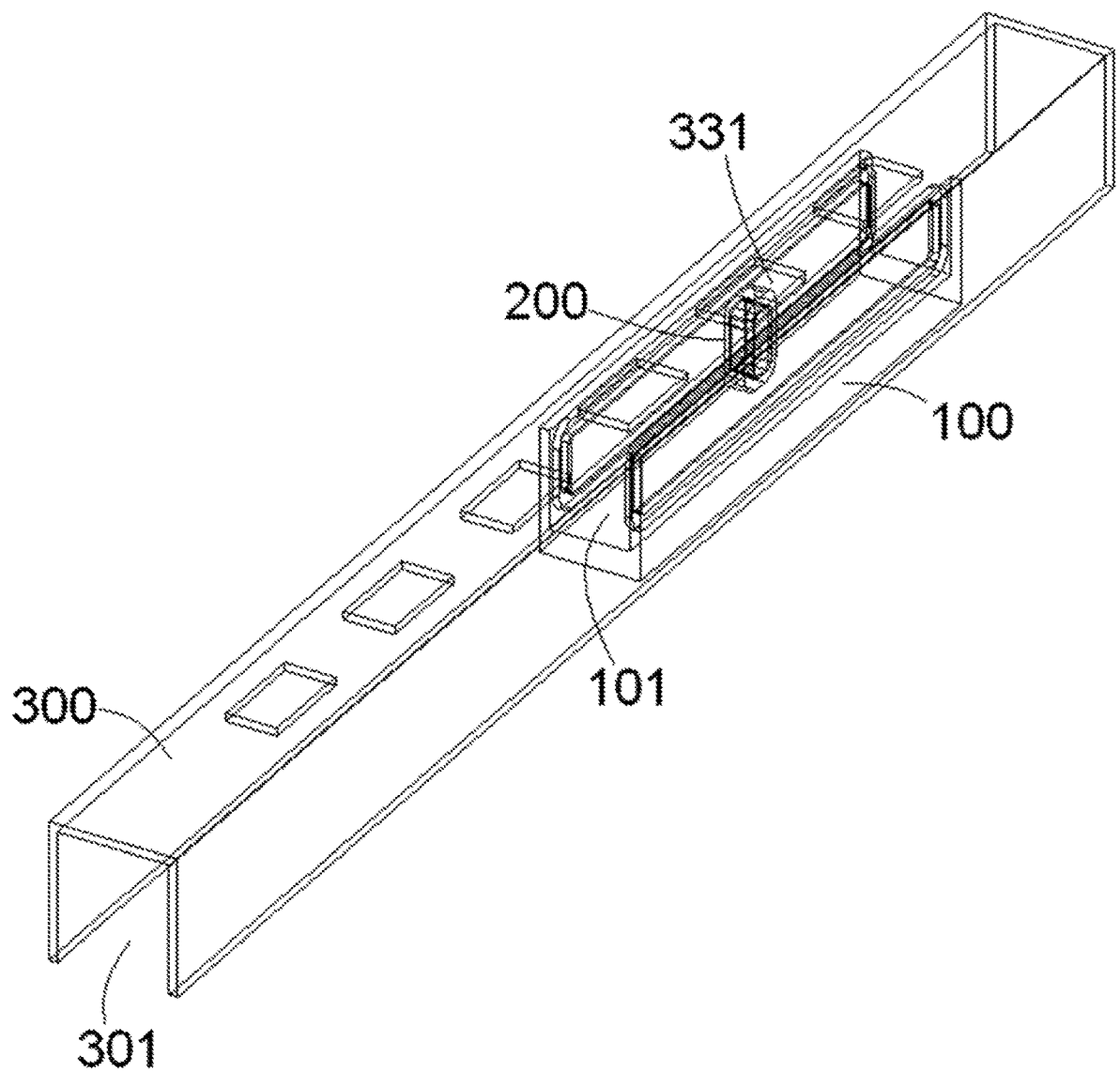
FIG. 4 is a sectional perspective view of the wireless power supply device of FIG. 1.
Figure 5:
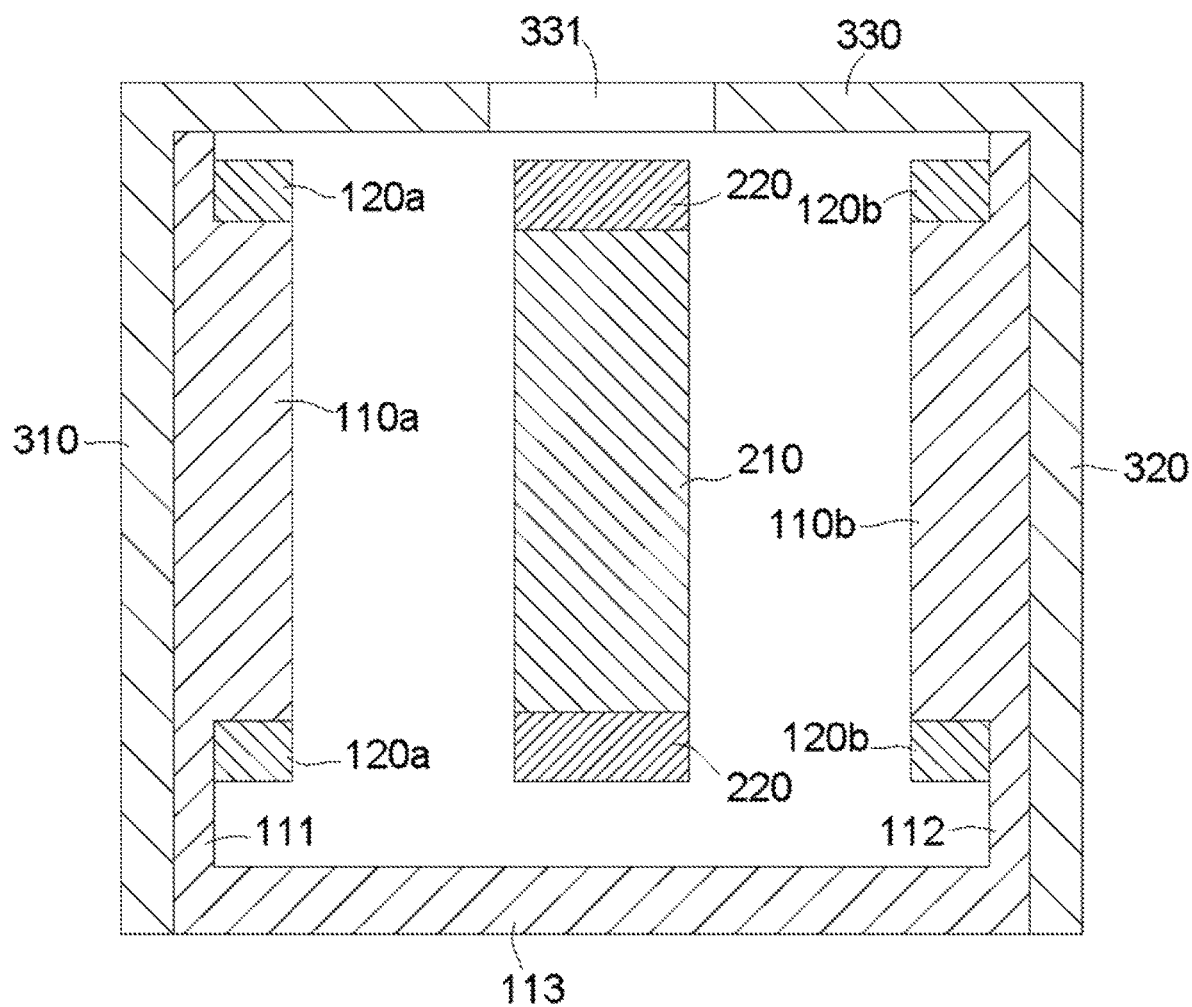
FIG. 5 is a sectional end view of the wireless power supply device of FIG. 1.

As shown in FIGS. 1-2, the transmitting coil assembly 100 includes a first ferrite core 110 and a plurality of transmitting coils 120a, 120b. The first ferrite core 110 has a receiving chamber 101 with an opening. The plurality of transmitting coils 120a, 120b is provided in the receiving chamber 101 of the first ferrite core 110. The receiving coil assembly 200 is adapted to be moved into the receiving chamber 101 through the opening of the receiving chamber 101 and located at a predetermined position in the receiving chamber 101, as shown in FIGS. 3-5, to be electromagnetically coupled with the transmitting coil assembly 100.

As shown in FIGS. 1 and 2, the plurality of transmitting coils 120a, 120b include a first transmitting coil 120a and a second transmitting coil 120b spaced from and facing the first transmitting coil 120a. The first transmitting coil 120a and the second transmitting coil 120b are adapted to produce magnetic fields with the same direction.

As shown in FIGS. 1-2, in an embodiment, the first transmitting coil 120a and the second transmitting coil 120b are connected in serials and wound in the same direction, so that the direction of the magnetic field generated by a current flowing through the first transmitting coil 120a is the same as the direction of the magnetic field generated by a current flowing through the second transmitting coil 120b.

As shown in FIGS. 1-2, in an embodiment, the first ferrite core 110 comprises a bottom wall 113, a first side wall 111 and a second side wall 112 at both sides of the bottom wall 113. In the shown embodiment, the first ferrite core 110 does not have a top wall; the first ferrite core 110 is opened at the top thereof. The first ferrite core 110 is formed as an elongated ferrite core with a substantially U-shaped cross-section in the shown embodiment.

As shown in FIGS. 1-2, a first protrusion 110a is formed on an inner side of the first side wall 111 and second protrusion 110b is formed on an inner side of the second side wall 112. The first transmitting coil 120a is wound on the first protrusion 110a. The second transmitting coil 120b is wound on the second protrusion 110b.

As shown in the embodiment of FIGS. 1 and 3-5, the wireless power supply device comprises a metal case 300. The metal case 300 has an inside space 301 in which the transmitting coil assembly 100 is received.

As shown in FIGS. 1 and 3-5, a window 331 is formed in a top wall 330 of the metal case 300. The opening of the receiving chamber 101 of the first ferrite core 110 faces the window 331. The receiving coil assembly 200 is adapted to be moved into the receiving chamber 101 through the window 331 of the metal case 300 and the opening of the receiving chamber 101 and located at a predetermined position in the receiving chamber 101, so as to be electromagnetically coupled with the transmitting coil assembly 100.

As shown in FIGS. 1 and 3-5, the metal case 300 has a bottom opening, and the transmitting coil assembly 100 is adapted to be moved into the inside space 301 of the metal case 300 through the bottom opening. When the receiving coil assembly 200 is moved into and located at the predetermined position in the receiving chamber 101, the receiving coil assembly 200 is positioned between the first transmitting coil 120a and the second transmitting coil 120b. Most of the magnetic field generated by the transmitting coil 100 is confined in the receiving chamber of the first ferrite core 110; only a very small amount of the magnetic field is leaked outside the first ferrite core 110, reducing the eddy current effect on the metal case 300 and improving the efficiency and the stability of the wireless power supply.

The receiving coil assembly 200, as shown in FIGS. 1 and 3-5, includes a second ferrite core 210 and a receiving coil 220 wound on the second ferrite core 210. When the receiving coil assembly 200 is moved into and located at the predetermined position in the receiving chamber 101, a center axis of the plurality of transmitting coils 120a, 120b is parallel to a center axis of the receiving coil 220. When the receiving coil assembly 200 is moved into and located at the predetermined position in the receiving chamber 101, the plurality of transmitting coils 120a, 120b and the receiving coil 220 have a common center axis.

As shown in the embodiment of FIGS. 1-5, the first protrusion 110a and the second protrusion 110b of the first ferrite core 110 has a cuboid shape. In other embodiments, the first protrusion 110a and the second protrusion 110b may have a cylinder shape or any other suitable shape. The first transmitting coil 120a and the second transmitting coil 120b are wound on the peripheral surface of the first protrusion 110a and the peripheral surface of the second protrusion 110b, respectively.

As shown in the embodiment of FIGS. 1-5, the second ferrite core 210 has a cuboid shape. In other embodiments, the second ferrite core 210 may have a cylinder shape or any other suitable shape. The second ferrite core 210 has a top surface, a bottom surface and a peripheral surface between the top surface and the bottom surface. The receiving coil 220 is wound on the peripheral surface of the second ferrite core 210.

As shown in FIGS. 1 and 3-5, the metal case 300 has a top wall 330 and a pair of side walls 310, 320 at both sides of the top wall 330. The metal case 300 does not have a bottom wall, that is, the metal case 300 is opened at the bottom side thereof. In the shown embodiment, the metal case 300 has a substantially inverted-U shape cross-section.

As shown in FIGS. 1 and 3-4, a length of the transmitting coil assembly 100 is longer than a length of the receiving coil assembly 200, so that a plurality of receiving coil assemblies 200 are adapted to be received in different locations in a single transmitting coil assembly 100 at the same time. The plurality of receiving coil assemblies 200 may be electromagnetically coupled with the single transmitting coil assembly 100 at the same time.

As shown in FIGS. 1, 3-4, a plurality of windows 331 are formed in the top wall 330 of the metal case 300, the plurality of receiving coil assemblies 200 are adapted to be moved into the metal case 300 through the plurality of windows 331, respectively, and be electromagnetically coupled with the single transmitting coil assembly 100 provided in the metal case 300.

In an embodiment, the transmitting coil assembly 100 is connected to a circuit board. The circuit board may have a DC-AC conversion circuit for converting a direct current into an alternating current. The alternating current from the DC-AC conversion circuit flows through a matching circuit on the circuit board and is used to drive the transmitting coil. The receiving coil assembly 200 is connected to another circuit board. In order to drive a load, the other circuit board may have a matching circuit, a rectifier, a filter and a DC-DC conversion circuit.

In another embodiment, an electrical apparatus comprises a load and the above wireless power supply device configured to supply power to the load. The electrical apparatus may be a refrigerator, a washing machine, an air conditioner, etc.

A wireless power supply device according to another embodiment, as shown in FIGS. 6-12, comprises a transmitting coil 100', a receiving coil assembly 200' adapted to be electromagnetically coupled with the transmitting coil 100', and a ferrite electromagnetic shielding member 400' having a receiving chamber 401' into which the transmitting coil 100' is received.

Figure 6:
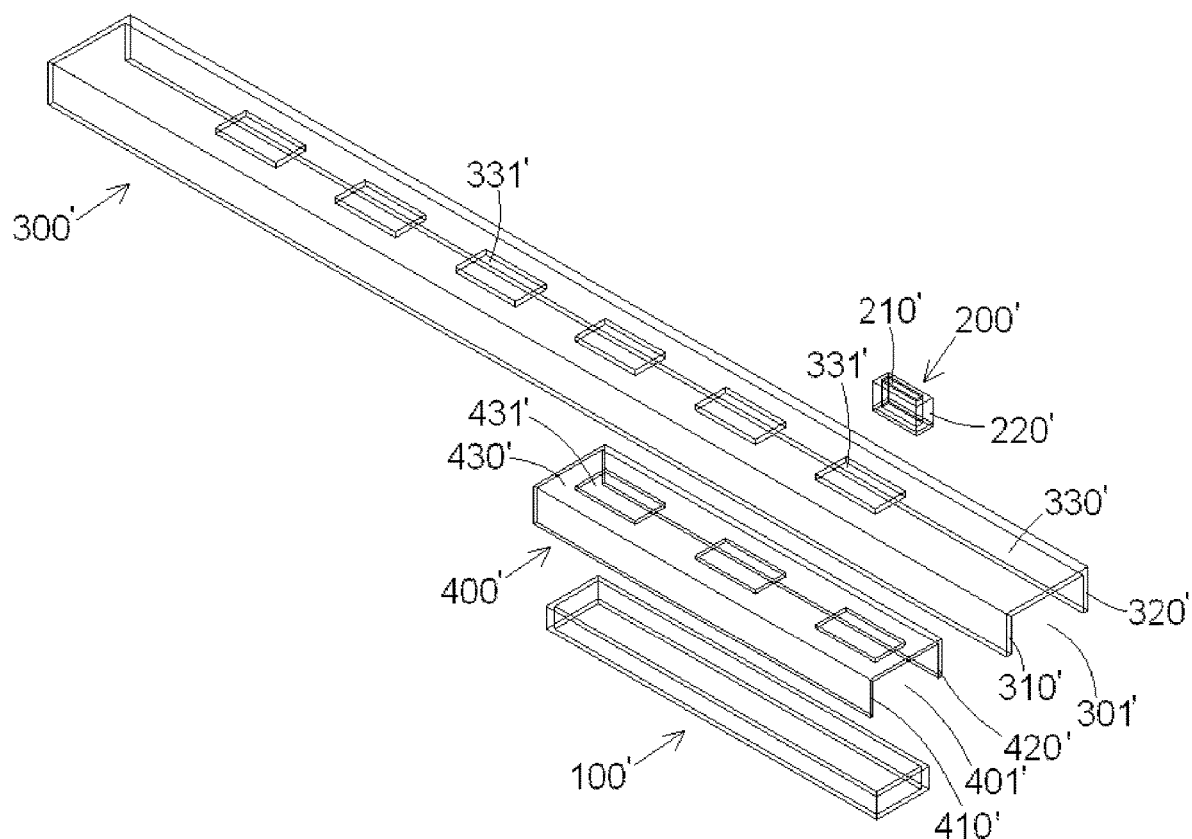
FIG. 6 is an exploded perspective view of a wireless power supply device according to another embodiment.
Figure 7:
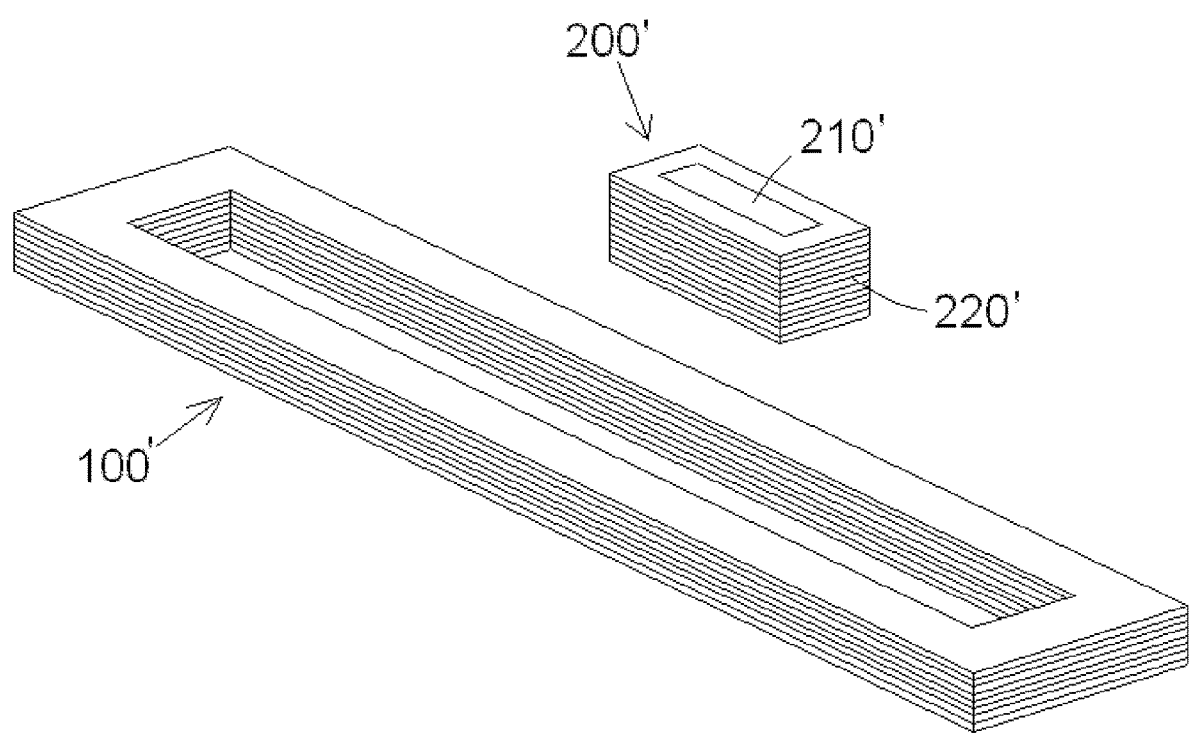
FIG. 7 is a perspective of a transmitting coil and a receiving coil assembly of the wireless power supply device of FIG. 6.

As shown in FIGS. 6 and 7, a first window 431' is formed in a top wall 430' of the ferrite electromagnetic shielding member 400', the receiving coil assembly 200' is adapted to be moved into the receiving chamber 401' through the first window 431' and located at a predetermined position in the receiving chamber 401', so as to be electromagnetically coupled with the transmitting coil 100'.

As shown in FIGS. 6 and 7, the wireless power supply device comprises a metal case 300' having an inside space 301' into which the ferrite electromagnetic shielding member 400' is adapted to be received. The transmitting coil 100' is disposed in the metal case 300', improving the appearance of the wireless power supply device.

As shown in FIGS. 6 and 7, the receiving coil assembly 200' comprises a ferrite core 210' and a receiving coil 220' wound on the ferrite core 210'.

Figure 8:
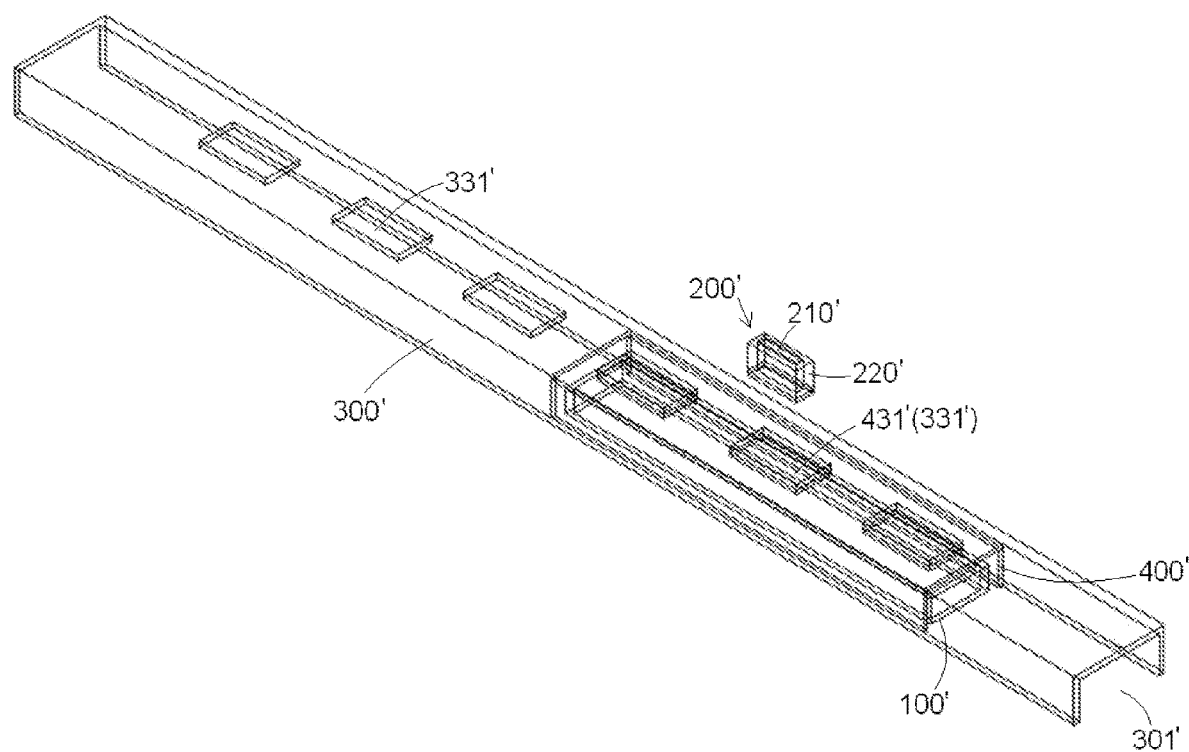
FIG. 8 is a sectional perspective view of the wireless power supply device of FIG. 6 with the receiving coil assembly disposed outside of a ferrite electromagnetic shielding member and metal case.
Figure 9:
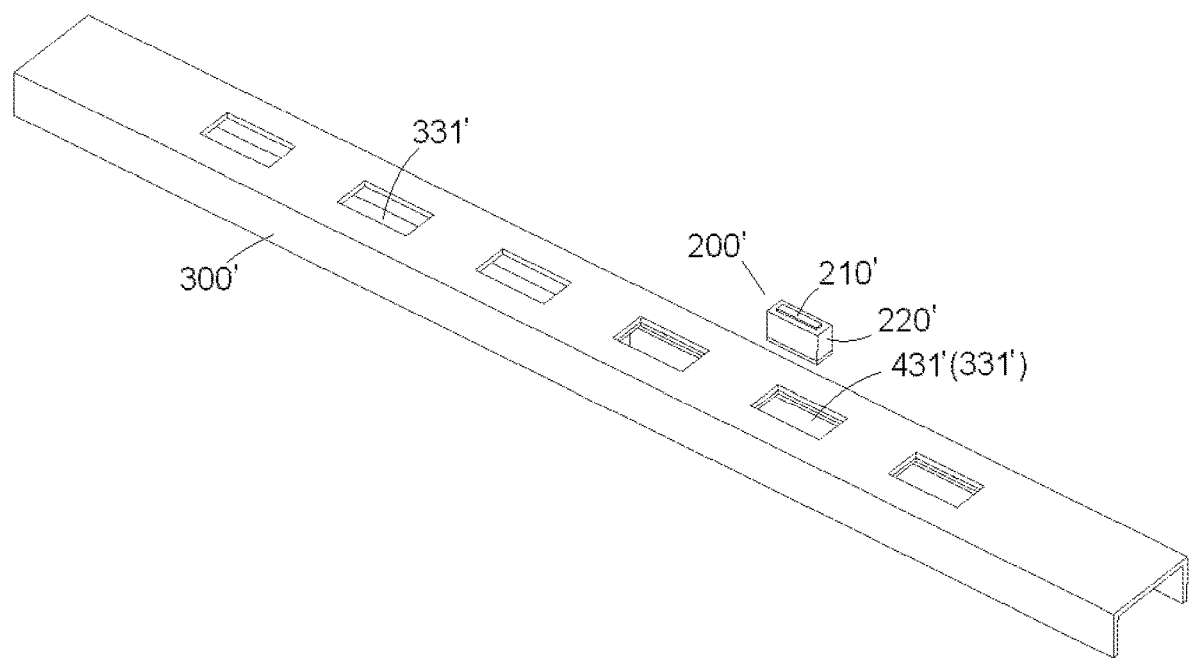
FIG. 9 is a partially exploded perspective view of the wireless power supply device of FIG. 8.

As shown in FIGS. 8 and 9, the ferrite electromagnetic shielding member 400' is received in the metal case 300' and the transmitting coil 100' is received in the ferrite electromagnetic shielding member 400'. The transmitting coil 100' is separated from the metal case 300' by the ferrite electromagnetic shielding member 400', which reduces the eddy current effect on the metal case 300' and prevents the metal case 300' from overheating, improving the efficiency and the stability of the wireless power supply.

As shown in FIGS. 8-11, a second window 331' corresponding to the first window 431' is formed in the top wall 330' of the metal case 300'. The receiving coil assembly 200' is adapted to be moved into the receiving chamber 401' through the first window 431' and the second window 331' and located at a predetermined position in the receiving chamber 401', so as to be electromagnetically coupled with the transmitting coil 100'.

Figure 10:
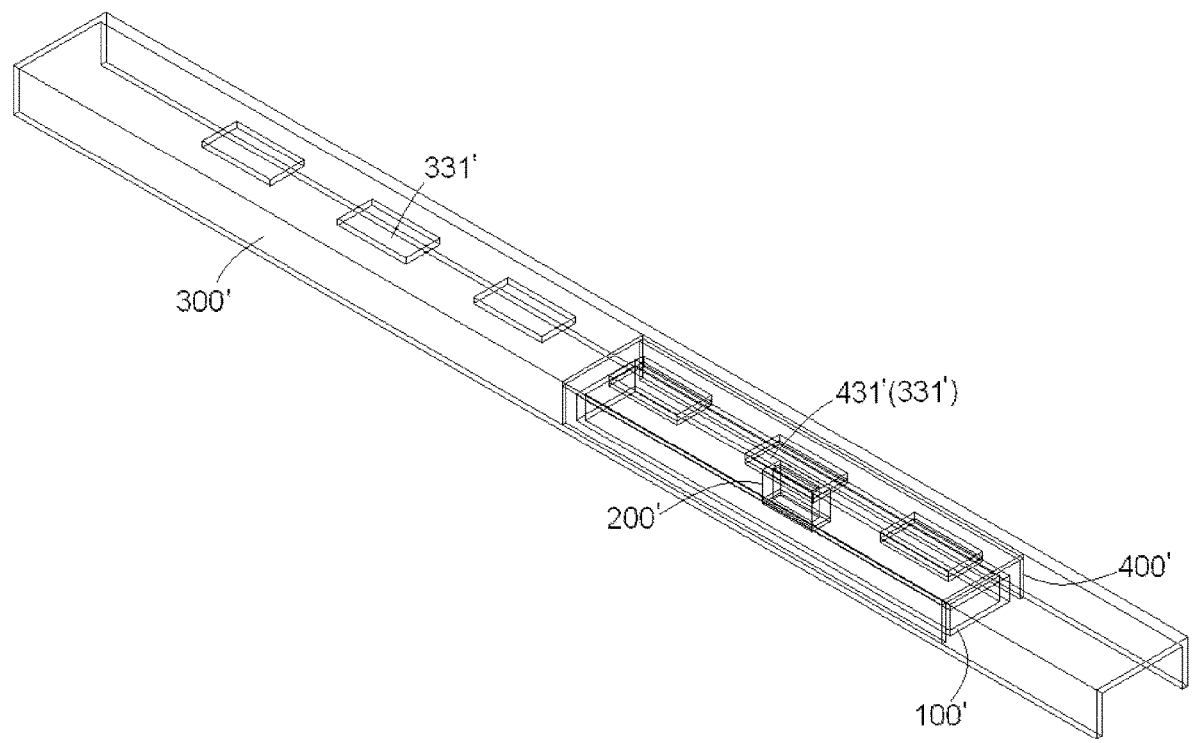
FIG. 10 is a sectional perspective view of the wireless power supply device of FIG. 6 with the receiving coil assembly inserted in the metal case.
Figure 11:
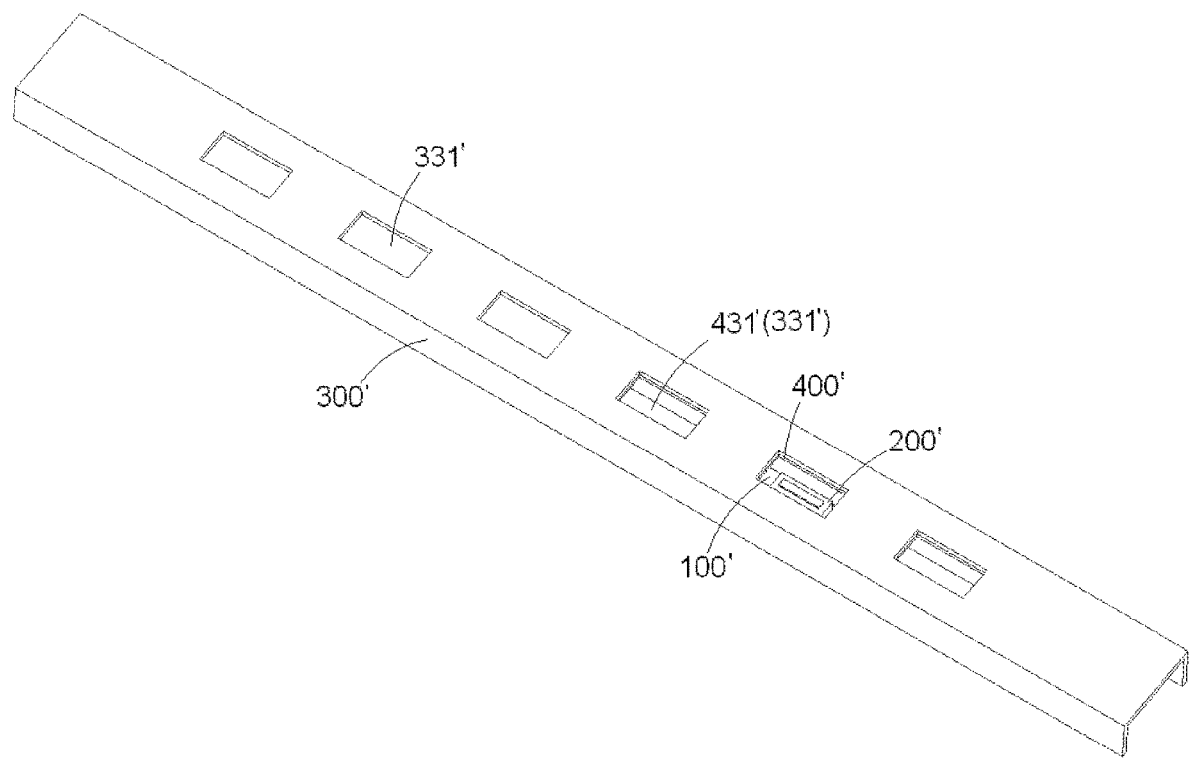
FIG. 11 is a perspective view of the wireless power supply device of FIG. 10.
Figure 12:
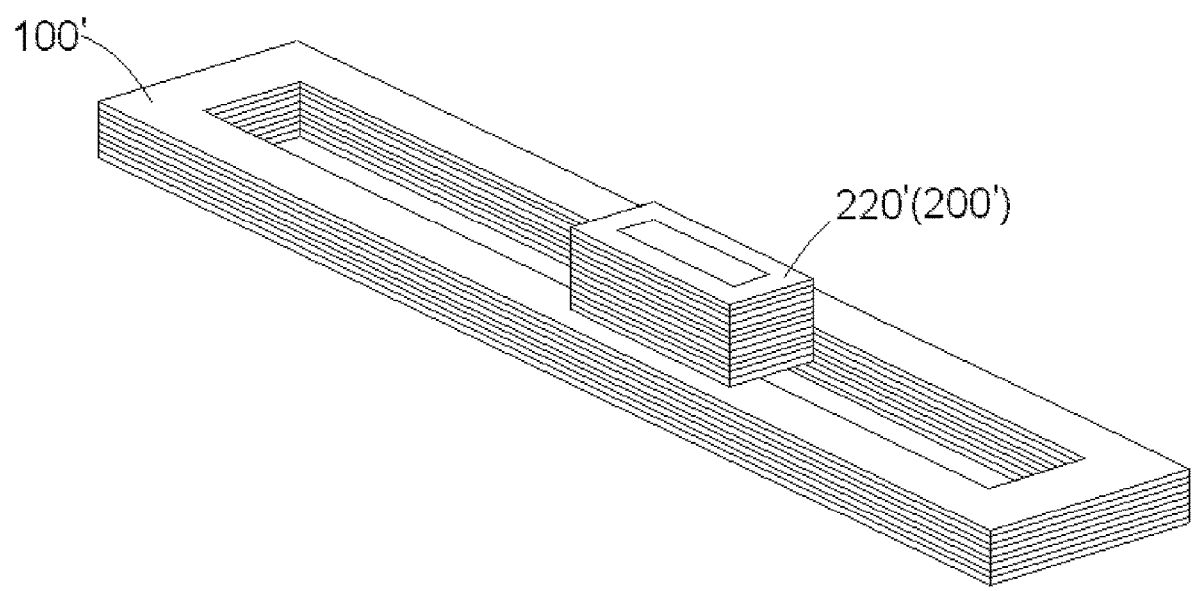
FIG. 12 shows a perspective view of the transmitting coil and the receiving coil assembly of the wireless power supply device of FIG. 10.

As shown in FIGS. 10-12, when the receiving coil assembly 200' is moved into and located at the predetermined position in the receiving chamber 401', a center axis of the transmitting coil 100' is parallel to that of the receiving coil 220'. A winding direction of the transmitting coil 100' is parallel to that of the receiving coil 220'.

As shown in FIGS. 6 and 8-11, the metal case 300' includes a pair of side walls 310', 320' at both sides of the top wall 330' thereof. The inside space 301' is defined by the top wall 330' and the pair of side walls 310', 320' of the metal case 300'. In the shown embodiment, the metal case 300' has a substantially inverted-U shape cross-section.

As shown in FIGS. 6 and 8-11, the ferrite electromagnetic shielding member 400' includes a pair of side walls 410', 420' at both sides of the top wall 430' thereof. The receiving chamber 401' is defined by the top wall 430' and the pair of side walls 410', 420' of the ferrite electromagnetic shielding member 400'. In the shown embodiment, the ferrite electromagnetic shielding member 400' is formed as a case with a substantially inverted-U shaped cross-section.

As shown in FIGS. 7 and 12, the ferrite core 210' has a cuboid shape with a top surface, a bottom surface and a peripheral surface between the top surface and the bottom surface. The receiving coil 220' is wound on the peripheral surface of the ferrite core 210'. As shown in FIGS. 7 and 12, the transmitting coil 100' may be a hollow rectangular coil. The shape of the transmitting coil 100' and the receiving coil 220' are not limited to the shown embodiments. The transmitting coil 100' and the receiving coil 200' have any other suitable shape, as long as the internal magnetic field of the coil is evenly distributed when the coil is energized.

As shown in FIGS. 6-12, a length of the transmitting coil 100' is longer than that of the receiving coil 220', so that a plurality of receiving coils 200' are adapted to be received in different locations in a single transmitting coil 100' in the length direction of the transmitting coil 100' at the same time. The plurality of receiving coils 200' may be electromagnetically coupled with the single transmitting coil assembly 100' at the same time.

As shown in FIGS. 6-12, a plurality of first windows 431' are formed in the top wall 430' of the ferrite electromagnetic shielding member 400'. A plurality of second windows 331' corresponding to the plurality of first windows 431', respectively, are formed in the top wall 330' of the metal case 300'. In this way, the plurality of receiving coil assemblies 200' are adapted to be moved into the receiving chamber 401' through the plurality of first windows 431' and the plurality of second windows 331', so as to be electromagnetically coupled with the single transmitting coil 100' provided in the receiving chamber 401'.

In an embodiment, the transmitting coil 100' is connected to a circuit board. The circuit board may have a DC-AC conversion circuit for converting a direct current into an alternating current. The alternating current from the DC-AC conversion circuit may flow through a matching circuit on the circuit board and used to drive the transmitting coil 100'. The receiving coil assembly 200' is connected to another circuit board. In order to drive a load, the other circuit board may have a matching circuit, a rectifier, a filter and a DC-DC conversion circuit.

In another embodiment, an electrical apparatus comprises a load and the wireless power supply device configured to supply power to the load. The electrical apparatus may be a refrigerator, a washing machine, an air conditioner, etc.

It should be appreciated for those skilled in this art that the above embodiments are intended to be illustrated, and not restrictive. For example, many modifications may be made to the above embodiments by those skilled in this art, and various features described in different embodiments may be freely combined with each other without conflicting in configuration or principle.

Although several embodiments have been shown and described, it would be appreciated by those skilled in the art that various changes or modifications may be made in these embodiments without departing from the principles and spirit of the disclosure, the scope of which is defined in the claims and their equivalents.

As used herein, an element recited in the singular and proceeded with the word "a" or "an" should be understood as not excluding plural of said elements or steps, unless such exclusion is explicitly stated. Furthermore, references to "one embodiment" of the present invention are not intended to be interpreted as excluding the existence of additional embodiments that also incorporate the recited features. Moreover, unless explicitly stated to the contrary, embodiments "comprising" or "having" an element or a plurality of elements having a particular property may include additional such elements not having that property.

What is claimed is:

1. A wireless power supply device, comprising:
   a transmitting coil assembly including a first ferrite core having a receiving chamber with an opening and a transmitting coil disposed in the receiving chamber of the first ferrite core;
   a receiving coil assembly adapted to be moved into the receiving chamber through the opening of the receiving chamber and located at a predetermined position in the receiving chamber, the receiving coil assembly electromagnetically coupled with the transmitting coil assembly; and a metal case having an inside space in which the transmitting coil assembly is received, a top wall of the metal case having a plurality of windows, the opening of the receiving chamber of the first ferrite core faces the window and the receiving coil assembly is adapted to be moved into the receiving chamber through one of the plurality of windows of the metal case and the opening of the receiving chamber, wherein the transmitting coil assembly is adapted to be moved into a plurality of positions within the inside space of the metal case, each of the plurality of positions corresponding to one of the plurality of windows for aligning with the receiving coil assembly received through each of the plurality of windows.

2. The wireless power supply device according to claim 1, wherein the transmitting coil assembly includes a plurality of transmitting coils with a first transmitting coil and a second transmitting coil spaced from and facing the first transmitting coil, the first transmitting coil and the second transmitting coil produce magnetic fields having a same direction.

3. The wireless power supply device according to claim 2, wherein the first transmitting coil and the second transmitting coil are connected serially and wound in a same direction.

4. The wireless power supply device according to claim 2, wherein the first ferrite core includes a bottom wall, a first side wall connected to a first side of the bottom wall, and a second side wall connected to a second side of the bottom wall, a first protrusion is disposed on an inner side of the first side wall and a second protrusion is disposed on an inner side of the second side wall, the first transmitting coil is wound on the first protrusion and the second transmitting coil is wound on the second protrusion.

5. The wireless power supply device according to claim 1, wherein the metal case has a bottom opening and the transmitting coil assembly is adapted to be moved into the inside space of the metal case through the bottom opening into one of the plurality of positions.

6. The wireless power supply device according to claim 2, wherein the receiving coil assembly is positioned between the first transmitting coil and the second transmitting coil when the receiving coil assembly is at the predetermined position in the receiving chamber.

7. The wireless power supply device according to claim 6, wherein the receiving coil assembly includes a second ferrite core and a receiving coil wound on the second ferrite core.

8. The wireless power supply device according to claim 7, wherein a center axis of each of the plurality of transmitting coils is parallel to that of the receiving coil when the receiving coil assembly is at the predetermined position in the receiving chamber.

9. The wireless power supply device according to claim 7, wherein the plurality of transmitting coils and the receiving coil have a common center axis when the receiving coil assembly is at the predetermined position in the receiving chamber.

10. The wireless power supply device according to claim 4, wherein the first protrusion and the second protrusion of the first ferrite core each have a cuboid shape or a cylinder shape, the first transmitting coil is wound on a peripheral surface of the first protrusion and the second transmitting coil is wound on a peripheral surface of the second protrusion.

11. The wireless power supply device according to claim 7, wherein the second ferrite core has a cuboid shape or a cylinder shape with a top surface, a bottom surface, and a peripheral surface between the top surface and the bottom surface, the receiving coil is wound on the peripheral surface of the second ferrite core.

12. The wireless power supply device according to claim 1, wherein the first ferrite core is an elongated ferrite core with a substantially U-shaped cross-section.

13. The wireless power supply device according to claim 1, wherein the metal case has a substantially inverted-U shaped cross-section.

14. The wireless power supply device according to claim 1, wherein a length of the transmitting coil assembly is longer than a length of the receiving coil assembly, a plurality of receiving coil assemblies are adapted to be simultaneously received in different locations in a single transmitting coil assembly and electromagnetically coupled with the single transmitting coil assembly.

15. The wireless power supply device according to claim 14, wherein the plurality of receiving coil assemblies are adapted to be moved into the metal case through the plurality of windows and electromagnetically coupled with the single transmitting coil assembly disposed in the metal case.

16. A wireless power supply device, comprising:
a transmitting coil;
a receiving coil assembly;
a ferrite electromagnetic shielding member having a receiving chamber in which the transmitting coil is received, a top wall of the ferrite electromagnetic shielding member has a first window, the receiving coil assembly is adapted to be moved into the receiving chamber through the first window and located at a predetermined position in the receiving chamber, the receiving coil assembly is electromagnetically coupled with the transmitting coil;
a metal case having an inside space in which the ferrite electromagnetic shielding member is received, a second window corresponding to the first window is formed in a top wall of the metal case and the receiving coil assembly is adapted to be moved into the receiving chamber through the first window and the second window wherein the ferrite electromagnetic shielding member and the transmitting coil are moveable into a plurality of positions within the inside space of the metal case, each of the plurality of positions corresponding to one of a plurality of windows formed in a top wall of the metal case for aligning with the receiving coil assembly received through each of the plurality of windows.

17. The wireless power supply device according to claim 16, wherein the receiving coil assembly includes a ferrite core and a receiving coil wound on the ferrite core.

18. The wireless power supply device according to claim 17, wherein a center axis of the transmitting coil is parallel to that of the receiving coil when the receiving coil assembly is at the predetermined position in the receiving chamber.

19. The wireless power supply device according to claim 16, wherein the metal case includes a pair of side walls connected to the top wall and the inside space is defined by the top wall and the pair of side walls.

20. The wireless power supply device according to claim 16, wherein the ferrite electromagnetic shielding member includes a pair of side walls connected to the top wall and the receiving chamber is defined by the top wall and the pair of side walls.

21. The wireless power supply device according to claim 17, wherein the ferrite core has a cuboid shape with a top surface, a bottom surface, and a peripheral surface between the top surface and the bottom surface, the receiving coil is wound on the peripheral surface of the ferrite core.

22. The wireless power supply device according to claim 21, wherein the transmitting coil is a hollow rectangular coil.

23. The wireless power supply device according to claim 16, wherein a length of the transmitting coil is longer than a length of the receiving coil assembly, a plurality of receiving coil assemblies are simultaneously received in different locations in a single transmitting coil in a length direction of the transmitting coil and are electromagnetically coupled with the single transmitting coil.

24. The wireless power supply device according to claim 23, wherein a plurality of first windows are formed in the top wall of the ferrite electromagnetic shielding member, a plurality of second windows corresponding to the plurality of first windows are formed in a top wall of the metal case, and the plurality of receiving coil assemblies are adapted to be moved into the receiving chamber through the plurality of first windows and the plurality of second windows and electromagnetically coupled with the single transmitting coil.

* * * * *